United States Patent [19]

Baker

[11] Patent Number: 4,776,966
[45] Date of Patent: Oct. 11, 1988

[54] FLUID COMPOSITIONS

[75] Inventor: Alan S. Baker, Berkshire, England

[73] Assignee: Imperial Chemical Industries PLC, London, England

[21] Appl. No.: 62,395

[22] Filed: Jun. 15, 1987

Related U.S. Application Data

[63] Continuation of Ser. No. 724,320, Apr. 17, 1985, abandoned.

[30] Foreign Application Priority Data

Apr. 24, 1984 [GB] United Kingdom ............... 8410393

[51] Int. Cl.$^4$ .................................................. C09K 7/06
[52] U.S. Cl. ................................ 252/8.515; 252/8.511
[58] Field of Search ........................... 252/8.511, 8.515

[56] References Cited

U.S. PATENT DOCUMENTS

| 3,255,108 | 6/1966 | Wiese . | |
|---|---|---|---|
| 3,269,946 | 8/1966 | Wiese . | |
| 3,709,819 | 1/1973 | Browning et al. | 252/8.511 |
| 4,203,877 | 5/1980 | Baker . | |
| 4,306,980 | 12/1981 | Brandt et al. | 252/8.511 |
| 4,425,462 | 1/1984 | Turner et al. | 252/8.515 |

FOREIGN PATENT DOCUMENTS 2002400 2/1979 United Kingdom .

*Primary Examiner*—Herbert B. Guynn
*Attorney, Agent, or Firm*—Cushman, Darby & Cushman

[57] ABSTRACT

Drilling fluid compositions of the invert oil-based type incorporate (i) as the agent for emulsifying the brine phase in the oil phase, a block or graft copolymer of the general formula $(A-COO)_m B$, where A and B represent polymeric components derived from a specified type of oil-soluble complex monocarboxylic acid and from a water-soluble polyalkylene glycol or polyether polyol, respectively, and m is an integer at least 2, and (ii) as the agent for dispersing solid particulate matter in the oil phase a surfactant containing a $C_{30-500}$ hydrocarbon chain as hydrophobic component, and a polar component adsorbable on to the particulate solid surface.

14 Claims, No Drawings

FLUID COMPOSITIONS

This is a continuation of application Ser. No. 724,320, filed Apr. 17, 1985, now abandoned.

This invention relates to oil-based fluid compositions for use in drilling operations, such as are involved in oil exploration, more particularly to such compositions containing a combination of a specified type of emulsifier and a specified type of dispersing agent.

The use of the so-called invert oil-based drilling fluids or muds, for example in oil exploration, is increasing rapidly owing to the more demanding requirements encountered in drilling deep and/or deviated wells, especially where down-hole turbine drills are employed. Compared with the longerestablished water-based drilling muds, they possess a number of advantages including reduced interaction with unstable formations and improved lubricity. In order to achieve certain objectives, in particular the obtaining of a cheaper product, the reduction of the flammability risk and improvement of the water acceptance of the mud, it has become customary to emulsify in the oil a brine, i.e. an aqueous solution of an inorganic salt such as sodium chloride or calcium chloride. Clearly, the higher the brine content the more fully are these objectives achieved, but in practice, where conventional surfactants are used for the emulsification, the achievable content of aqueous disperse phase is limited by loss of emulsion stability and excessive viscosity.

Much improved results are obtained by the use as the emulsifier of block or graft copolymers of the type described in British Patent Specification No. 2002400 A, namely copolymers comprising in the molecule a polymeric component derived from an oil-soluble complex monocarboxylic acid and another polymeric component derived from a water-soluble polyalkylene glycol. The use of such copolymers enables emulsions of good stability and relatively low viscosity to be obtained where the brine has a high salt content, thus achieving the desirable objectives mentioned above.

However, drilling muds frequently contain, in addition to the constituents already referred to, a particulate weighting agent, such as barite, dispersed in the oil phase in order to impart a sufficiently high density to the mud as a whole to overcome any back-pressure which may develop during the drilling operation. A dispersing agent is normally required to assist in keeping the weighting agent in dispersion, and it has an additional function in also maintaining in dispersion the cuttings which are produced in the course of drilling. Furthermore, an activated clay, such as bentonite, is often incorporated in the mud to act as a support for the weighting agent and the cuttings, and the dispersing agent is required to stabilise this material in dispersion too. Frequently a single surfactant has been employed to perform both the emulsifying and the dispersing functions, but in general this gives unsatisfactory results, it being found impossible to incorporate high levels of weighting agent, or to accept high loadings of cuttings, into the oil phase without excessive thickening, or even complete loss of stability, of the emulsion taking place.

The present invention is based upon the use of two distinct surfactant species as the emulsifier and the dispersing agent respectively, but we find that, where the above-mentioned block or graft copolymers are employed for the first of these functions, conventional surfactants do not perform adequately as the complementary dispersing agent. Excellent results are, however, obtained by the use, in conjunction with the copolymers, of a particular class of surfactants as hereinafter defined.

According to the present invention there is provided a drilling fluid composition of the invert oil-based type, wherein there is incorporated (i) as the agent for emulsifying the brine phase in the oil phase a block or graft copolymer of the general formula $(A - COO)_m B$, wherein A and B represent polymeric components as hereinbelow defined and m is an integer at least 2, and (ii) as the agent for dispersing solid particulate matter in the oil phase a surfactant containing a hydrophobic component which is a saturated or unsaturated hydrocarbon chain containing from 30 to 500 carbon atoms and a polar component which is capable of becoming adsorbed on to the surface of the said solid particulate matter.

In the block or graft copolymer emulsifying agent (i) having the general formula $(A - COO)_m B$, wherein m is an integer at least 2, each polymeric component A has a molecular weight of at least 500 and is the residue of an oil-soluble complex monocarboxylic acid having the general structural formula

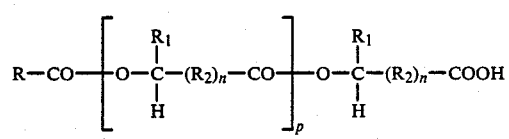

in which R is hydrogen or a monovalent hydrocarbon or substituted hydrocarbon group, $R_1$ is hydrogen or a monovalent $C_1$ to $C_{24}$ hydrocarbon group, $R_2$ is a divalent $C_1$ to $C_{24}$ hydrocarbon group, n is zero or 1, and p is zero or an integer up to 200; each polymeric component B has a molecular weight of at least 500 and, in the case where m is 2, is the divalent residue of a water-soluble polyalkylene glycol having the general formula

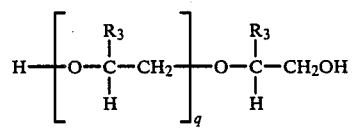

in which $R_3$ is hydrogen or a $C_1$ to $C_3$ alkyl group, q is an integer from 10 up to 500, or, in the case where m is greater than 2, is the residue of valency m of a water-soluble polyether polyol having the general formula

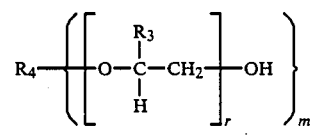

in which $R_3$ and m have their previous significance, r is zero or an integer from 1 to 500, provided that the total number of

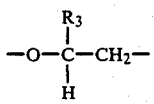

units in the molecule is at least 10, and $R_4$ is the residue of an organic compound containing in the molecule m hydrogen atoms reactive with an alkylene oxide. Block copolymers of the above class, and the methods of their preparation, are more fully described in our British Patent No. 2002400 already referred to. A particular member of the class which is especially useful in the drilling fluids of the present invention is a copolymer in which each A component is the residue of poly(12-hydroxystearic acid) chain-terminated with stearic acid and of molecular weight 1750 approximately, and in which each B component is derived from polyethylene glycol of molecular weight 1500 and constitutes 30% by weight of the total copolymer. This copolymer may be produced by self-condensation of commercial 12-hydroxystearic acid (which already contains a proportion of stearic acid that can function as chain terminator), followed by reaction of the product with the polyethylene glycol in the presence of an esterification catalyst. Another very useful member of the same class of copolymer is analogous to that just described except that the B component constitutes 40% by weight of the total copolymer.

In the dispersing agent (ii), the hydrophobic component may be a polymer of a mono-olefin, in particular a polymer of a mono-olefin containing from 2 to 6 carbon atoms such as ethylene, propylene, butene-1 and, especially, isobutene. Such a component may conveniently be derived from a polyalk(en)ylsuccinic anhydride. Anhydrides of this class are known commercial materials which are made by an addition reaction at elevated temperature, optionally in the presence of a halogen catalyst, between a polyolefin, such as one of those referred to above, containing a terminal unsaturated grouping and maleic anhydride. A final hydrogenation step may be performed if a saturated product is required. Typical poly(isobutenyl)succinic anhydrides which are available commercially have number average molecular weights in the range 400 to 5000.

Since the succinic anhydride residue in compounds of the above class is itself polar in character, the compounds themselves may be employed directly as the dispersing agent (ii). Preferred poly(isobutenyl)succinic anhydrides for this purpose are those having molecular weights in the range 400 to 5000. However, further polar components may be introduced into the dispersant molecule by reacting a polyalk(en)ylsuccinic anhydride with one or more appropriate co-reactants. The anhydride group reacts readily with compounds containing, for example, hydroxyl or amino groups, and therefore other dispersing agents suitable for use according to the invention may be made by reacting the anhydride with a compound of polar character containing in the molecule at least one hydroxyl or amino group. Thus the anhydride may be reacted with a polyol, for example ethylene glycol, propylene glycol, glycerol, trimethylolpropane, pentaerythritol or sorbitol; or with a polyamine, for example ethylene diamine, trimethylene diamine, hexamethylene diamine, dimethylaminopropylamine or diethylaminopropylamine; or with a hydroxyamine, for example monoethanolamine, diethanolamine, dipropanolamine, tris(hydroxymethyl)aminomethane or dimethylaminoethanol. The anhydride may alternatively be reacted with a compound of polar character containing, in addition to a hydroxyl group or an amino group, another functional group, such as a carboxyl group; examples of such compounds include glycine and glycollic acid. Where the reaction product of the anhydride and the polar compound itself contains a free functional group, the polar component may be further extended by reacting that group with a second compound of polar character. Thus, for example, the reaction product of the anhydride with a hydroxyamine may be further reacted with monochloracetic acid.

In preparing the dispersants for use according to the invention the reaction of the polyalk(en)ylsuccinic anhydride with the polar compound is preferably carried out under relatively mild conditions. The two reactants may be heated together at a temperature in the range 70°–150° C. optionally in the presence of an inert solvent or diluent such as xylene, for a sufficient period of time for the reaction mixture to attain a substantially constant acid value.

The polyalk(en)ylsuccinic anhydride and the polar compound are preferably used in approximately stoichiometric proportions to each other with respect to the anhydride ring and the hydroxyl or amino group. Generally, a half-derivative of the substituted succinic acid, containing a free carboxyl group derived from the opening of the anhydride ring, will be formed thereby. Where the product is reacted with a further polar compound, stoichiometric proportions are again preferred.

Constituents of the drilling fluid compositions of the invention, apart from the emulsifying and dispersing agents hereinabove described, are those which are conventional in the art, that is to say (i) an oil, (ii) water or a brine and usually (iii) a particulate weighting agent.

Suitable oils include those of the hydrocarbon type, in particular petroleum fractions such as kerosene and diesel oil, but also mineral oils and vegetable oils. Paraffinic hydrocarbons are preferred for offshore drilling operations since they are less toxic to marine life than, e.g. diesel oil.

By "brine" is meant an aqueous solution of an inorganic salt; the salts commonly employed include sodium chloride, calcium chloride, magnesium chloride and zinc bromide. They may be present in any concentration up to saturation level.

Particulate weighting agents which are suitable include barite, iron oxides (e.g. haematite) and ilmenite ($FeTiO_3$).

Typically, the liquid components of the drilling fluids of the invention consist of from 90% to 10% by weight of the oil phase and from 10% to 90% by weight of the brine phase, more usually from 80% to 20% by weight of the oil phase and from 20% to 80% by weight of the brine phase.

The amount incorporated of the emulsifying agent (i) preferably lies in the range 0.2% to 10% by weight based on the brine phase. The concentration of the dispersing agent (ii) employed is largely influenced by the density which the mud is desired to have, depending on the nature of the weighting agent (e.g. its density, particle size distribution and surface characteristics) and the proportion of it which is present. Both of these factors are subject to considerable variation according to the circumstances in which the mud is to be used. In most cases, however, the dispersing agent will be employed in an amount of from 0.1% to 10% by weight based on the weighting agent.

Another class of material which is preferably incorporated in the drilling fluids of the invention is an activated clay, which, as already mentioned, functions as a support for the weighting agent and also for the drill cuttings, and at the same time imparts a desirable pseudoplastic rheology to the fluid. The material which is most frequently used for this purpose in existing drilling muds is a treated bentonite and this is also very suitable in the present case. We have found, however, that a lower proportion of activated clay suffices to give satisfactory performance in the fluids of the invention than is required in conventional drilling fluids. In the compositions of the invention, the required pseudoplastic rheology is achieved to a large extent by the incorporation of a high brine content and through appropriate choice of the level of the specified emulsifying agent; this cannot be accomplished with surfactant emulsifiers of conventional type.

The specified dispersing agents confer on the compositions the advantage of high stability, that is to say the absence of any tendency for the particulate solids present to "flush" into the aqueous phase or for the oil phase to separate to any significant extent. The compositions also exhibit good resistance to flocculation, so that high levels of both weighting agent and cuttings can be dispersed, even when the oil phase content is relatively low, without the generation of excessive viscosity or "structure".

Other advantages of the fluids of the invention over the known fluids are that they do not settle significantly on standing, but neither do they set up to a gel; circulation of the mud after an interruption in the drilling operation ban accordingly readily be resumed. The fluids have good lubricating properties and are very suitable for use in conjunction with downhole turbine drills.

The invention is illustrated by the following Examples in which parts and percentages are by weight.

EXAMPLE 1

A. Preparation of Emulsifying Agent

A mixture of a commercial grade of 12-hydroxystearic acid containing 15% of stearic acid (95.83 parts), toluene (17.04 parts) and methanesulphonic acid (0.19 part) was heated in a flask fitted with agitator, condenser, Dean & Stark water separator and nitrogen inlet line. Condensation was effected at 160° C. until the acid value of the polymeric monocarboxylic acid obtained had fallen to 33 mg KOH/g. This product (solids content 85%; 770 parts) was added to polyethylene glycol, mol. wt. 1500 (290 parts), together with xylene (8 parts) and the mixture was heated at 230° C. in the same apparatus as before, with removal of water, until the acid value had fallen to 5 mg KOH/g. The emulsifying agent thu obtained had a solids content of 95% and a viscosity of 3.2 poise at 25° C., measured at 75% solids in xylene.

B. Preparation of Dispersing Agent

A mixture of poly(isobutenyl)succinic anhydride, mol. wt. 1000 (85% active constituent solution in xylene, 1176.0 parts), monoethanolamine (61.0 parts) and low aromatic-content kerosene (867.3 parts) was heated for 3 hours at 70° C. under an atmosphere of nitrogen in a round-bottom flask fitted with an anchor-type stirrer. The product had a solids content of 50.6%.

C. Preparation of Drilling Fluid

The emulsifying agent described in part A above (2.1 parts) and the dispersing agent described in part B above (0.48 part) were dissolved in low-aromatic kerosene (16.0 parts), and there was slowly added to the solution, with gentle stirring, micronised barite powder (38.12 parts). When all the barite had been added, the resulting dispersion was subjected to shear in a "Silverson" mixer (Registered Trade Mark) running at full speed for 2 minutes. There was then slowly stirred into the product a bentonite gel (1.0 part) prepared as described below, followed by a solution of calcium chloride (10.6 parts) in demineralised water (31.7 parts). The resulting composition was subjected to emulsification for 3 minutes at full speed in the "Silverson" mixer, with emulsifier screen head fitted.

The drilling fluid thus obtained had an oil/water ratio of 30/70, and a density of 1.40 g/cm$^3$; the emulsifying agent content was 5.0%, based on the disperse phase present. On storage at 70° C. for 48 hours, the fluid showed no signs of settlement and only slight separation of the oil phase was observed.

The bentonite gel used in the above preparation was made by blending together in the "Silverson" mixer at high speed low aromatic kerosene (600 parts), the emulsifying agent of part A above (100 parts) and "Bentone" 38 (100 parts; "Bentone" is a Registered Trade Mark). The resulting dispersion was then diluted with further kerosene (110 parts) to give a slack gel.

EXAMPLE 2

A. Preparation of Dispersing Agent

A mixture of poly(isobutenyl)succinic anhydride, mol. wt. 1000 (85% solution, 476.0 parts) and diethanolamine (104.0 parts) was reacted as described in Example 1, part B. The product had a solids content of 86.2%.

B. Preparation of Drilling Fluid

The procedure described in Example 1, part C, was repeated except that the dispersing agent there referred to was replaced by the dispersing agent described in part A above (0.28 part) and the amounts of the deionised water and the barite were altered to 31.8 parts and 38.22 parts respectively.

The resulting drilling fluid of 30/70 oil/water ratio had a density of 1.40 g/cm$^3$ and an emulsifying agent content of 5.0% based on the disperse phase. After storage for 4 months at room temperature it showed no signs of settlement and only slight separation of the oil phase was detected.

EXAMPLE 3

The procedure described in Example 1, part C, was repeated but with the following amounts of the constituents:

| | |
|---|---|
| Emulsifying agent of Example 1, part A | 1.24 parts |
| Dispersing agent of Example 1, part B | 0.87 part |
| Low-aromatic kerosene | 9.47 parts |

| | |
|---|---|
| Barite powder | 62.80 parts |
| Bentonite gel of Example 1 | 0.59 part |
| Calcium chloride | 6.27 parts |

| Demineralised water | 18.76 parts |

The 30/70 oil/water drilling fluid thus obtained had a density of 2.0 g/cm$^3$ and an emulsifying agent content of 5.0% based on the disperse phase. It was of similar stability to the fluid of Example 1.

EXAMPLE 4

The procedure described in Example 1, part C was repeated but with the following amounts of the constituents:

| Emulsifying agent of Example 1, part A | 0.94 part |
| Dispersing agent of Example 1, part B | 0.50 part |
| Low-aromatic kerosene | 43.19 parts |
| Barite powder | 33.46 parts |
| Bentonite gel of Example 1 | 2.99 parts |
| Calcium chloride | 4.73 parts |
| Demineralised water | 14.19 parts |

The resulting drilling fluid had an oil/water ratio of 70/30 and a density of 1.40 g/cm$^3$; the emulsifying agent content was 5.0%, based on the disperse phase. The fluid had a similar stability to that described in Example 2.

EXAMPLE 5

The procedure of Example 1, part C was repeated but with the following amounts of the constituents:

| Emulsifying agent of Example 1, part A | 1.59 parts |
| Dispersing agent of Example 1, part B | 0.50 part |
| Low-aromatic kerosene | 30.18 parts |
| Barite powder | 33.73 parts |
| Bentonite gel of Example 1 | 2.20 Parts |
| Calcium chloride | 7.94 parts |
| Demineralised water | 23.83 parts |

The resulting drilling fluid had an oil/water ratio of 50/50 and a density of 1.40 g/cm$^3$; the emulsifying agent content was 5.0%, based on the disperse phase. After storage for 48 hours at room temperature the fluid exhibited only very slight settlement and very slight separation of the oil phase.

EXAMPLE 6

The procedure of Example 1, part C was repeated but with the following amounts of the constituents:

| Emulsifying agent of Example 1, part A | 2.25 parts |
| Dispersing agent of Example 1, part B | 0.51 part |
| Low-aromatic kerosene | 17.04 parts |
| Barite powder | 34.13 parts |
| Bentonite gel of Example 1 | 1.07 part |
| Calcium chloride | 11.25 parts |
| Demineralised water | 33.75 parts |

The resulting 30/70 oil/water drilling fluid had a density of 1.40 g/cm$^3$; the emulsifying agent content was 4.2%, based on the disperse phase. On storage for 48 hours at room temperature, the fluid showed no settlement and only extremely slight separation of the oil phase.

EXAMPLE 7

The procedure of Example 4 was repeated with the same amounts of the constituents, except that the low-aromatic kerosene was replaced by an equal amount of diesel oil.

The resulting 70/30 oil/water drilling fluid had a density of 1.40 g/cm$^3$ and an emulsifying agent content of 5.0%, based on the disperse phase. After storage for 48 hours at room temperature, it showed only very slight settlement and slight separation of the oil phase.

EXAMPLE 8

The procedure of Example 5 was repeated with the same amounts of the constituents, except that the low-aromatic kerosene was replaced by an equal amount of diesel oil.

The 50/50 oil/water drilling fluid obtained had a density of 1.40 g/cm$^3$ and an emulsifying agent content of 5.0%, based on the disperse phase. After storage for 48 hours at room temperature it showed only very slight settlement and very slight separation of the oil phase.

EXAMPLE 9

The procedure of Example 6 was repeated with the same amounts of the constituents, except that the low-aromatic kerosene was replaced by an equal amount of diesel oil.

The 30/70 oil/water drilling fluid obtained had a density of 1.40 g/cm$^3$ and an emulsifying agent content of 5.2%, based on the disperse phase. It showed neither settlement nor separation of the oil phase after storage for 48 hours at room temperature.

EXAMPLE 10

The procedure of Example 1, part C was repeated but with the following amounts of constituents:

| Emulsifying agent of Example 1, part A | 2.12 parts |
| Poly(isobutenyl)succinic anhydride, mol. wt. 1000 (85% solution) | 0.28 part |
| Low-aromatic kerosene | 16.05 parts |
| Barite powder | 38.15 parts |
| Bentonite gel of Example 1 | 1.01 parts |
| Calcium chloride | 10.60 parts |
| Demineralised water | 31.79 parts |

The resulting 30/70 oil/water drilling fluid had a density of 1.40 g/cm$^3$ and an emulsifying agent content of 5.0%, based on the disperse phase. After storage for 24 hours at room temperature it showed no settlement and only very slight separation of the oil phase.

EXAMPLE 11

A. Preparation of Dispersing Agent

A mixture of poly(isobutenyl)succinic anhydride, mol. wt. 1000 (85% solution, 300.0 parts) and dimethylaminopropylamine (26.05 parts) was reacted as described in Example 1, part B. The product had a solids content of 86.2%.

B. Preparation of Drilling Fluid

The procedure of Example 1, part C was repeated but with the following amounts of constituents:

| Emulsifying agent of Example 1, part A | 2.14 parts |
| Dispersing agent of part A above | 0.24 part |
| Low-aromatic kerosene | 16.22 parts |
| Barite powder | 38.56 parts |
| Calcium chloride | 10.71 parts |

-continued

| Demineralised water | 32.13 parts |

The 30/70 oil/water drilling fluid obtained had a density of 1.40 g/cm3 and an emulsifying agent content of 5.0%, based on the disperse phase. After storage for 1 month at room temperature it exhibited some soft settlement but no separation of the oil phase had occurred.

EXAMPLE 12

A. Preparation of Dispersing Agent

A mixture of poly(isobutenyl)succinic anhydride, mol. wt. 1000 (85% solution, 400.0 parts) and diethylaminopropylamine (39.15 parts) was reacted as described in Example 1, part B, except that the reaction temperature was 140° C. instead of 70° C. The product had a solids content of 86.3%.

B. Preparation of Drilling Fluid

The procedure described in Example 11, part B was repeated, except that the dispersing agent there referred to was replaced by an equal amount of the dispersing agent of part A above.

The 30/70 oil/water drilling fluid thus obtained had a density of 1.40 g/cm$^3$ and an emulsifying agent content of 5.0%, based on the disperse phase. After storage for 24 hours at room temperature, it showed neither settlement nor separation of the oil phase.

EXAMPLE 13

A. Preparation of Dispersing Agent

A mixture of poly(isobutenyl)succinic anhydride, mol. wt. 1000 (85% solution, 300.0 parts) and glycerol (23.5 parts) was reacted as described in Example 1, part B, except that the reaction temperature employed was 140° C. The product had a solids content of 86.0%.

B. Preparation of Drilling Fluid

The procedure of Example 10 was repeated, but with the poly(isobutenyl)succinic anhydride there described replaced by an equal amount of the dispersing agent of part A above.

The resulting drilling fluid had similar characteristics and stability to that of Example 10.

EXAMPLE 14

A. Preparation of Dispersing Agent

A mixture of poly(isobutenyl)succinic anhydride, mol.wt. 1000 (85% solution, 400.0 parts) and glycine (26.04 parts) was reacted as described in Example 1, part B but at a temperature of 140° C.

The product had a solids content of 85.9%.

B. Preparation of Drilling Fluid

The procedure of Example 10 was repeated, but with the poly(isobutenyl)succinic anhydride replaced by an equal amount of the dispersing agent of part A above.

The 30/70 oil/water drilling fluid obtained had similar characteristics to that of Example 10. It showed neither settlement nor separation of the oil phase after storage for 24 hours at room temperature.

EXAMPLE 15

A. Preparation of Dispersing Agent

A mixture of poly(isobutenyl)succinic anhydride, mol. wt. 1000 (85% solution, 300.0 parts) and glycollic acid (19.4 parts) was reacted as described in Example 1, part B. The product had a solids content of 85.9%.

B. Preparation of Drilling Fluid

The procedure of Example 10 was repeated, replacing the poly(isobutenyl)succinic anhydride by an equal amount of the dispersing agent of part A above.

The resulting drilling fluid had similar characteristics and showed similar stability to that of Example 10.

EXAMPLE 16

A. Preparation of Dispersing Agent

A mixture of poly(isobutenyl)succinic anhydride, mol. wt. 1000 (85% solution, 190.1 parts) and monoethanolamine (9.9 parts) was heated for 3 hours at 70° C. under an atmosphere of nitrogen in a round-bottom flask fitted with an anchor-type stirrer. There was then added to the product monochloracetic acid (15.1 parts) and heating with stirring was continued for 5 hours at 160° C. The product had a solids content of 85.6%.

B. Preparation of Drilling Fluid

The procedure of Example 10 was repeated, replacing the poly(isobutenyl)succinic anhydride by an equal amount of the dispersing agent of part A above.

The resulting drilling fluid had similar characteristics and stability to that of Example 10.

EXAMPLE 17

A. Preparation of Dispersing Agent

A mixture of poly(isobutenyl)succinic anhydride, mol. wt. 1000 (85% solution, 313.0 parts) and tris(hydroxymethyl)-aminomethane(32.2 parts) was heated with stirring under an atmosphere of nitrogen for 3 hours at 110° C. The product had a solids content of 86.4%.

B. Preparation of Drilling Fluid

The procedure of Example 10 was repeated, replacing the poly(isobutenyl)succinic anhydride by an equal amount of the dispersing agent of part A above.

The resulting drilling fluid had similar characteristics and stability to that of Example 10.

EXAMPLE 18

A. Preparation of Dispersing Agent

A mixture of poly(isobutenyl)succinic anhydride, mol. wt. 1000 (85% solution, 359.9 parts) and ethylene glycol (18.63 parts) was reacted as described in Example 1, part B, except that the reaction temperature employed was 140° C. The product had a solids content of 86.0% by weight.

B. Preparation of Drilling Fluid

The procedure of Example 10 was repeated, replacing the poly(isobutenyl)succinic anhydride by an equal amount of the dispersing agent of part A above.

The resulting drilling fluid had similar characteristics and stability to that of Example.10.

EXAMPLE 19

A. Preparation of Dispersing Agent

A mixture of poly(isobutenyl)succinic anhydride, mol. wt. 1000 (85% solution, 200.0 parts) and dimethylaminoethanol (15.15 parts) was reacted as described in Example 1, part B. The product had a solids content of 86.1%.

B. Preparation of Drilling Fluid

The procedure of Example 10 was repeated, but replacing the poly(isobutenyl)succinic anhydride by an equal amount of the dispersing agent of part A above.

The resulting drilling fluid had similar characteristics and stability to that of Example 10.

COMPARATIVE EXAMPLE

The procedure of Example 1, part C was repeated, but with the following constituents:

| | |
|---|---|
| Emulsifying agent of Example 1, part A | 2.13 parts |
| Low-aromatic kerosene | 16.09 parts |
| Barite powder | 38.25 parts |
| Bentonite gel of Example 1 | 1.02 parts |
| Calcium chloride | 10.63 parts |
| Demineralised water | 31.88 parts |

The 30/70 oil/water drilling fluid thus obtained had a density of 1.40 g/cm$^3$ and an emulsifying agent content of 5.0%, based on the disperse phase. As soon as emulsification with the 'Silverson' mixer ceased, however, the product underwent complete collapse of the emulsion, with coarse aggregates of the barite forming in the lower aqueous phase and the oil phase separating as a milky, upper layer.

EXAMPLE 20

The procedure of Example 1, part C was repeated, but with the following amounts of the constituents:

| | |
|---|---|
| Emulsifying agent of Example 1, part A | 1.27 parts |
| Dispersing agent of Example 1, part B | 0.75 part |
| Low-aromatic kerosene | 9.10 parts |
| Barite powder | 62.89 parts |
| Bentonite gel | 0.61 parts |
| Calcium chloride | 6.35 parts |
| Demineralised water | 19.10 parts |

The 30/70 oil/water drilling fluid thus obtained had a density of 2.0 g/cm$^3$ and an emulsifying agent content of 5.0%, based on the disperse phase. After storage at room temperature for 72 hours it showed no settlement and only a slight separation of the oil phase had occurred.

EXAMPLE 21

A. Preparation of Dispersing Agent

A mixture of poly(isobutenyl)succinic anhydride, mol. wt. 750 (100% solids, 1200.0 parts), monoethanolamine (100.7 parts) and xylene (136 parts) was reacted as described in Example 1, part B.

The product had a solids content of 80.0%.

B. Preparation of Drilling Fluid

The procedure described in Example 11 was repeated, but replacing the dispersing agent there used by an equal amount of the dispersing agent of part A above.

The drilling fluid thus obtained had a density of 1.40 g/cm$^3$ and an emulsifying agent content of 5.0%, based on the disperse phase. After storage at room temperature for 72 hours, it showed neither settlement nor separation of the oil phase.

EXAMPLE 22

A. Preparation of Dispersing Agent

A mixture of poly(isobutenyl)succinic anhydride, mol. wt. 750 (100% solids, 1200.0 parts), diethanolamine (171.7 parts) and xylene (272 parts) was reacted as described in Example 1, part B. The product has a solids content of 80.0%.

B. Preparation of Drilling Fluid

The procedure of Example 11 was repeated, but replacing the dispersing agent there used by an equal amount of the dispersing agent of part A above.

The resulting drilling fluid had similar characteristics to that of Example 11. It showed neither settlement nor separation of the oil phase after storage at room temperature for 72 hours.

EXAMPLE 23

The procedure of Example 1, part C was repeated, but with the following constituents:

| | |
|---|---|
| Emulsifying agent of Example 1, part A | 2.14 parts |
| Dispersing agent of Example 1, part B | 0.49 parts |
| Low-aromatic kerosene | 16.18 parts |
| Barite powder | 38.46 parts |
| Magnesium chloride | 10.68 parts |
| Demineralised water | 32.05 parts |

The 30/70 oil/water drilling fluid thus obtained had a density of 1.40 g/cm$^3$ and an emulsifying agent content of 5.0%, based on the disperse phase. After storage at room temperature for 120 hours, neither settlement nor separation of the oil phase were detected.

EXAMPLE 24

A. Preparation of Emulsifying Agent

The procedure described in Example 1, part A was repeated, but using, in place of the polyethylene glycol, mol. wt. 1500 (290 parts), a blend of polyethylene glycol, mol. wt. 1500 (136.7 parts) and polyethylene glycol, mol. wt. 4000 (303.7 parts). The product had a solids content of 96% and a viscosity of 4.8 poise measured at 75% solids in xylene.

B. Preparation of Drilling Fluid

The procedure of Example 1, part C was repeated, but with the following constituents:

| | |
|---|---|
| Emulsifying agent of part A above | 2.12 parts |
| Dispersing agent of Example 1, part B | 0.48 parts |
| Low-aromatic kerosene | 16.01 parts |
| Barite powder | 38.07 parts |
| Bentonite gel | 1.01 parts |
| Calcium chloride | 10.58 parts |
| Demineralised water | 31.73 parts |

The 30/70 oil/water drilling fluid thus obtained had a density of 1.40 g/cm$^3$ and an emulsifying agent content of 5.0%, based on the disperse phase. After storage at 70° C. for 48 hours, it showed no signs of settlement and only slight separation of the oil phase had occurred.

EXAMPLE 25

The procedure of Example 24, part B was repeated, but with the following amounts of the constituents:

| | | |
|---|---:|---|
| Emulsifying agent of Example 24, part A | 1.50 | parts |
| Dispersing agent of Example 1, part B | 0.48 | parts |
| Low-aromatic kerosene | 28.40 | parts |
| Barite powder | 37.66 | parts |
| Bentonite gel | 2.07 | parts |
| Calcium chloride | 7.47 | parts |
| Demineralised water | 22.42 | parts |

The 50/50 oil/water drilling fluid thus obtained had a density of 1.40 g/cm³ and an emulsifying agent content of 5.0%, based on the disperse phase. After storage at room temperature for 120 hours, it showed only a slight amount of soft settlement and slight separation of the oil phase.

EXAMPLE 26

The procedure of Example 24, part B was repeated, but with the following amounts of the constituents:

| | | |
|---|---:|---|
| Emulsifying agent of Example 24, part A | 0.89 | parts |
| Dispersing agent of Example 1, part B | 0.47 | parts |
| Low-aromatic kerosene | 40.64 | parts |
| Barite powder | 37.39 | parts |
| Bentonite gel | 2.81 | parts |
| Calcium chloride | 4.45 | parts |
| Demineralised water | 13.35 | parts |

The resulting 70/30 oil/water drilling fluid thus obtained had a density of 1.40 g/cm³ and an emulsifying agent content of 5.0%, based on the disperse phase. after storage at room temperature for 120 hours, it showed a moderate amount of soft settlement and some separation of the oil phase.

EXAMPLE 27

The procedure of Example 1, part C was repeated, but with the following constituents:

| | | |
|---|---:|---|
| Emulsifying agent of Example 1, part A | 1.53 | parts |
| Dispersing agent of Example 1, part B | 0.49 | parts |
| Low-aromatic kerosene | 16.79 | parts |
| Barite powder | 38.46 | parts |
| Calcium chloride | 10.68 | parts |
| Demineralised water | 32.05 | parts |

The resulting 30/70 oil/water drilling fluid had a density of 1.40 g/cm³ and an emulsifying agent content of 3.6%, based on the disperse phase. After storage at room temperature for 72 hours, it showed neither settlement nor separation of the oil phase.

EXAMPLE 28

The procedure of Example 1, part C was repeated, but with the following constituents:

| | | |
|---|---:|---|
| Emulsifying agent of Example 1, part A | 1.22 | parts |
| Dispersing agent of Example 1, part B | 0.49 | parts |
| Low-aromatic kerosene | 10.99 | parts |
| Barite powder | 38.46 | parts |
| Calcium chloride | 12.21 | parts |
| Demineralised water | 36.63 | parts |

The resulting drilling fluid had an oil/water ratio of 20/80 and a density of 1.40 g/cm³; the emulsifying agent content was 2.5%, based on the disperse phase. After storage at room temperature for 72 hours, the fluid exhibited neither settlement nor separation of the oil phase.

I claim:

1. A drilling fluid composition of the invert oil-based type comprising a solid particulate material dispersed in an emulsion of an aqueous inorganic salt in an oil wherein there is incorporated
   (i) as the agent for emulsifying the aqueous phase in the oil phase an effective amount of a block or graft co-polymer of the general formula $(A\text{-COO})_m B$, where m in an integer of at least 2 and,
   (a) A is a polymeric component having a molecular weight of at least 500 and is the residue of an oil-soluble complex mono-carboxylic acid of the general structural formula:

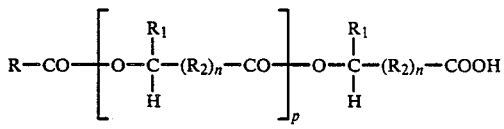

in which R is hydrogen or a monovalent hydrocarbon or substituted hydrocarbon group, $R_1$ is hydrogen or a monovalent $C_1$ to $C_{24}$ hydrocarbon group, $R_2$ is a divalent $C_1$ to $C_{24}$ hydrocarbon group, n is zero or 1 and p is zero or an integer of up to 200; and
   (b) B is a polymeric component having a molecular weight of at least 500 and, in the case where m is 2, is the divalent residue of a water-soluble polyalkylene glycol of the general formula:

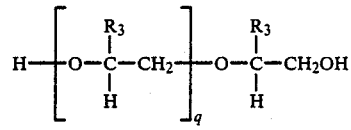

in which R3 is hydrogen or a $C_1$ to $C_3$ alkyl group, q is an integer from 10 to 500, or, in the case where m is greater than 2, is the residue of valency m of a water-soluble polyether polyol of the general formula:

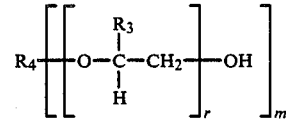

in which $R_3$ and m have their previous significance, r is zero or an integer from 1 to 500, provided that the total number of

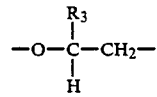

units in the molecule is at least 10, and $R_4$ is the residue of an organic compound containing in the molecule m hydrogen atoms reactive with an alkylene oxide, and
   (ii) as the agent for dispersing the particulate solid in the oil phase an effective amount of a surfactant which is capable of becoming absorbed on to the surface of said particulate solid and is polyalk(en)yl succinic anhydride wherein the polyalk(en)yl group carries the succinic anhydride or succinic acid group terminally thereon and is a polymer of a $C_2$ to $C_6$ mono-olefin said polymer having a chain containing from 30 to 500 carbon atoms in the chain, or (2) the reaction product of said anhydride with a compound of polar character selected from an alcohol containing at least one hydroxyl group, a polyamine, an alkanolamine containing at least one hydroxyl and at least one amino group, compound containing a hydroxy group and a carboxyl group and a compound containing an amino group and a carboxyl group.

2. A drilling fluid composition as claimed in claim 1 wherein the polymeric component A of the emulsifying agent (i) is the residue of a poly(12-hydroxystearic acid) chain terminated with stearic acid and of molecular weight approximately 1750, and wherein the polymeric component B of the emulsifying agent is derived from polyethylene glycol of molecular weight approximately 1500, the said component B constituting approximately 30 percent by weight of the copolymer agent.

3. A drilling fluid composition as claimed in claim 1 wherein said polyalkenyl group in said dispersing agent is a poly(isobutene) group.

4. A drilling fluid composition as claimed in claim 1 wherein said dispersing agent is the reaction product of a poly(isobutenyl) succinic anhydride of average molecular weight in the range 400 to 5000.

5. A drilling fluid composition as claimed in claim 1 wherein the dispersing ageint (ii) is selected from poly(isobutenyl) succinic anhydride, the reaction product of poly(isobutenyl) succinic anhydride with an alcohol, the reaction product of poly(isobutenyl) succinic anhydride with a glycol, the reaction product of poly(isobutenyl) succinic anhydride with an polyamine and the reaction product of poly(isobutentyl) succinic anhydride with an alkanolamine, the said anhydride having an average molecular weight of from 400 to 5000.

6. A drilling fluid composition as claimed in claim 1 wherein the liquid components consist of from 90 to 10% by weight of the oil phase and from 10 to 90% by weight of the aqueous phase.

7. A drilling fluid composition as claimed in claim 1 wherein the liquid components consist of at least 30% by weight of the aqueous phase.

8. A drilling fluid composition as claimed in claim 1 wherein the emulsifying agent (i) is present in an amount of from 0.2 to 10% by weight based on the aqueous phase.

9. A drilling fluid composition as claimed in claim 1 wherein the dispersing agent (ii) is present in an amount of from 0.1 to 10% by weight based on the particulate solid present.

10. The composition of claim 1 wherein the compound of polar character is ethylene glycol, propylen glycol, glycerol, trimethylolpropane, pentaerythritol, sorbitol, ethylene diamine, trimethylene diamine hexamethylene diamine, dimethylaminopropylamine, diethylaminopropylamine, monoethanolamine, diethanolamine, dipropanolamine, tris(hydroxy-methyl)aminomethane, dimethylaminoethanol, glycine or glycollic acid.

11. The composition of claim 1 wherein component (ii) is the product of reacting a polyalk(en)ylsuccinic anhydride with a hydroxy-amine and further reacting with monochloroacetic acid.

12. A drilling fluid composition of the invert oil-based type comprising a solid particulate material dispersed in an emulsion comprising at least 30 parts by weight of an aqueous solution of an inorganic salt and up to 70 parts by weight of an oil wherein there is incorporated.

(i) as the agent for emulsifying the aqueous phase in the oil phase from 0.2 to 10% by weight of the aqueous phase of a graft co-polmer of the general formula $(A\text{-}COO)_m B$, where m is an integer of at least 2, A is the residue of a poly(12-hydroxystearic acid) chain terminated with stearic acid and of molecular weight approximately 1750, and B is derived from polyethylene glycol of molecular weight approximately 1500, the said component B constituting approximately 30 percent by weight of the copolymer, and (ii) as the agent for dispersing the particulate solid in the oil phase from 0.1 to 10% by weight based on the particulate solid of a surfactant which is capable of becoming absorbed on to the surface of the particulate solid and is the reaction product of a poly(butenyl) succinic anhydride having an average molecular weight in the range of from 400 to 5,000, wherein the poly(butenyl) group carries the succinic anhydride residue terminally thereon, with a compound of polar character selected from an alcohol, a polyamine, an alkanolamine, a hydroxycarboxylic acid and an aminocarboxylic acid.

13. A composition as claimed in claim 12, wherein the dispersing agent (ii) is a poly(isobutenyl) succinic anhydride of average molecular weight in the range 400 to 5000.

14. A composition as claimed in claim 12, wherein the dispersing agent (ii) is the product of reacting a poly(isobutenyl)succinic anhydride of average molecular weight in the range 400 to 5000 said a compound of polar character.

* * * * *